United States Patent
Mansour et al.

(10) Patent No.: US 12,543,161 B2
(45) Date of Patent: Feb. 3, 2026

(54) SYSTEM AND METHOD FOR COMMUNICATION MANAGEMENT USING BANDWIDTH PARTS

(71) Applicant: T-Mobile Innovations LLC, Overland Park, KS (US)

(72) Inventors: Nagi A. Mansour, Arlington, VA (US); Akin Ozozlu, McLean, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 350 days.

(21) Appl. No.: 18/310,686

(22) Filed: May 2, 2023

(65) Prior Publication Data
US 2024/0373411 A1 Nov. 7, 2024

(51) Int. Cl.
*H04W 72/0457* (2023.01)
*H04W 36/06* (2009.01)
*H04W 72/54* (2023.01)

(52) U.S. Cl.
CPC ....... *H04W 72/0457* (2023.01); *H04W 36/06* (2013.01); *H04W 72/54* (2023.01)

(58) Field of Classification Search
CPC .. H04W 72/0457; H04W 36/06; H04W 72/54
See application file for complete search history.

(56) References Cited

U.S. PATENT DOCUMENTS

| 10,735,078 | B2 | 8/2020 | Ly et al. | |
| 11,190,255 | B2 | 11/2021 | Zhou et al. | |
| 11,395,299 | B2 | 7/2022 | Babaei et al. | |
| 2021/0329666 | A1 | 10/2021 | Ljung et al. | |
| 2023/0130407 | A1* | 4/2023 | Dimou | H04W 24/10 370/329 |
| 2024/0121025 | A1* | 4/2024 | Zhang | H04L 1/0016 |
| 2025/0193924 | A1* | 6/2025 | Xu | H04W 24/08 |

FOREIGN PATENT DOCUMENTS

WO WO-2019196896 A1 * 10/2019 ............ H04W 72/23

OTHER PUBLICATIONS

Lin et al., "A Primer on Bandwidth Parts in 5G New Radio," 5G and Beyond, Springer, Cham, pp. 357-370 (2021).

* cited by examiner

*Primary Examiner* — Harry H Kim
(74) *Attorney, Agent, or Firm* — Jones Robb, PLLC

(57) ABSTRACT

Systems, methods, and processing nodes for managing network communications perform and/or comprise: configuring a first bandwidth part (BWP) and a second BWP for a wireless device, wherein the wireless device is configured to communicate with an access node over the first BWP; monitoring an actual value of a traffic quality parameter for communications between the wireless device and the access node using the first BWP; determining an expected value of the traffic quality parameter for communications between the wireless device and the access node using the second BWP; and in response to a determination that the expected value of the traffic quality parameter exceeds the actual value of the traffic quality parameter, instructing the wireless device to switch from communication with the access node using the first BWP to communication with the access node using the second BWP.

17 Claims, 4 Drawing Sheets

SYSTEM AND METHOD FOR COMMUNICATION MANAGEMENT USING BANDWIDTH PARTS

TECHNICAL BACKGROUND

Wireless telecommunications are generally provided via a plurality of geographically overlapping networks. From an infrastructure standpoint, a wireless device ("user equipment" or UE) may receive telecommunications services via an access node. For cellular telephone and data services, the individual networks may implement a plurality of radio access technologies (RATs) simultaneously using one or a plurality of access nodes. RATs can include, for example, 3G RATs such as Global System for Mobile Communications (GSM), Universal Mobile Telecommunications System (UMTS), Code-Division Multiple Access (CDMA), etc.; 4G RATs such as Worldwide Interoperability for Microwave Access (WiMAX), Long Term Evolution (LTE), etc.; and 5G RATs such as new radio (NR).

Various portions of the electromagnetic spectrum are allocated to wireless communications. For example, 5G NR communication utilizes frequencies below 6 GHz (Frequency Range 1) and above 24 GHz (Frequency Range 2), which are further divided into a plurality of bands which themselves may be further divided into component carriers (CCs). In NR communication, CCs may correspond to bandwidths of up to 100 megahertz (MHz) in Frequency Range 1 and up to 400 MHz in Frequency Range 2. NR CCs may also be aggregated together to provide increased bandwidth. Due to this wide bandwidth, NR introduces the concept of a bandwidth part (BWP), which is a group of contiguous of resource blocks (RBs). A BWP may have a bandwidth of less than or equal to a bandwidth of the CC in which it resides, and generally greater than or equal to the bandwidth required for one synchronization signal block (SSB). A given CC may include multiple BWPs. Different BWPs may be configured with different parameters and/or signal characteristics. A wireless device may be configured with up to four BWPs in the downlink (DL) and uplink (UL) directions, but only one BWP may be active at a given time. Because different BWPs may utilize different frequency resources, they may exhibit different communication characteristics. The different communication characteristics may be attributed to inherent differences in the characteristics of communications over different frequencies, to differences in traffic and/or usage, and so on.

OVERVIEW

Various aspects of the present disclosure relate to systems and methods of managing network communications (e.g., by dynamically assigning wireless devices to bandwidth parts) in a telecommunications network.

In one exemplary aspect of the present disclosure, a method of managing network resources comprises configuring a first bandwidth part (BWP) and a second BWP for a wireless device, wherein the wireless device is configured to communicate with an access node using the first BWP; monitoring an actual value of a traffic quality parameter for communications between the wireless device and the access node using the first BWP; determining an expected value of the traffic quality parameter for communications between the wireless device and the access node using the second BWP; and in response to a determination that the expected value of the traffic quality parameter exceeds the actual value of the traffic quality parameter, instructing the wireless device to switch from communication with the access node using the first BWP to communication with the access node using the second BWP.

In another exemplary aspect of the present disclosure, a system for managing network resources comprises an access node configured to communicate with a wireless device over a band including a first bandwidth part (BWP) and a second BWP, the access node including at least one electronic processor configured to perform operations including: determining that the wireless device is communicating with the access node using the first BWP; monitoring a traffic quality parameter for communications between the wireless device and the access node using the first BWP; and in response to a determination that the traffic quality parameter would be improved if the wireless device were communicating with the access node using the second BWP, transmitting a first instruction to the wireless device, the first instruction causing the wireless device to switch from using the first BWP to using the second BWP.

In yet another exemplary aspect of the present disclosure, a non-transitory computer-readable medium stores instructions that, when executed by an electronic processor of a processing node, cause the processing node to perform operations comprising defining a first dedicated bandwidth part (BWP) and a second BWP for communications between an access node and a first wireless device, wherein the first BWP and the second BWP utilize resources in the same communication band; monitoring an actual traffic pattern for communications between the access node and the first wireless device using the first BWP; determining an expected traffic pattern for communications between the access node and the first wireless device using the second BWP; and in response to a determination that the expected traffic pattern exhibits an improved communication performance compared to the actual traffic pattern, instructing the first wireless device to switch to communicating with the access node using the second BWP.

In this manner, these and other aspects of the present disclosure provide for improvements in at least the technical field of telecommunications, as well as the related technical fields of network management, device management, network security, wireless communications, and the like.

This disclosure can be embodied in various forms, including hardware or circuits controlled by computer-implemented methods, computer program products, computer systems and networks, user interfaces, and application programming interfaces; as well as hardware-implemented methods, application specific integrated circuits, field programmable gate arrays, and the like. The foregoing summary is intended solely to provide a general idea of various aspects of the present disclosure, and does not limit the scope of the disclosure in any way.

BRIEF DESCRIPTION OF THE DRAWINGS

These and other more detailed and specific features of various embodiments are more fully disclosed in the following description, reference being had to the accompanying drawings, in which.

DETAILED DESCRIPTION

Figure 1:
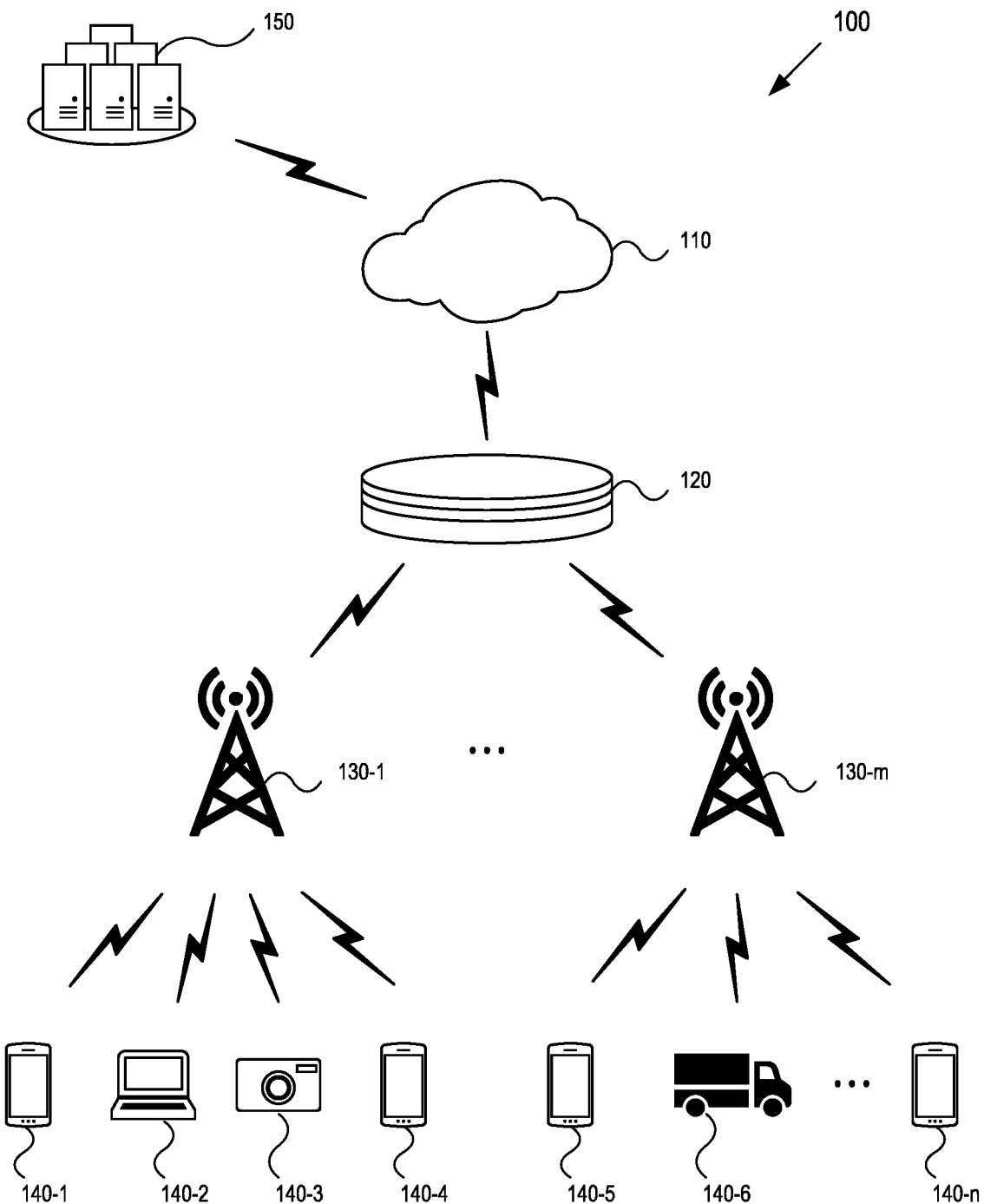
FIG. 1 illustrates an exemplary system for wireless communication in accordance with various aspects of the present disclosure.

In the following description, numerous details are set forth, such as flowcharts, schematics, and system configurations. It will be readily apparent to one skilled in the art that these specific details are merely exemplary and not intended to limit the scope of this application.

In addition to the particular systems and methods described herein, the operations described herein may be implemented as computer-readable instructions or methods, and a processing node or nodes on the network for executing the instructions or methods. The processing node or nodes may include an electronic processor included in the access node and/or an electronic processor included in any controller node in the wireless network that is coupled to the access node.

As noted above, different portions of the electromagnetic spectrum may exhibit different radio frequency (RF) characteristics for wireless communications. While some of these characteristics are inherent and/or intrinsic and based on the communication frequency itself, other characteristics may be affected by environmental factors including but not limited to the number of wireless devices communicating on a given frequency, the type of data communications occurring on a given frequency, external sources of RF noise, and so on. Thus, even when a given portion of bandwidth (e.g., a given BWP) to which a wireless device is assigned provides satisfactory communication performance at the time of assignment, it may occur that at some later point a different portion of bandwidth (e.g., a different BWP) would provide improved communication performance if the wireless device were switched thereto. Therefore, there exists a need for systems, devices, and methods for communication management in which a wireless device may be dynamically switched to communicate using the portion of bandwidth that provides a desired level of performance. Thus, various aspects of the present disclosure provide for systems, devices, and methods which improve NR UE and/or access node performance, provide improved utilization of resources (e.g., better spectral efficiency, and/or improved battery usage), provide improved communication performance (e.g., better throughput, and/or better signal to interference and noise ratio (SINR)), and the like.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include a UE or end-user wireless device that communicates with the access node directly without being relayed by a relay node. Additionally, "wireless device" may encompass any type of wireless device, such as a smartphone, a tablet, a laptop computer, and so on. The term "wireless device" is used interchangeably with the term "wireless communication device" herein.

In accordance with various aspects of the present disclosure, a cellular or wireless network may be provided by an access node. While examples described herein may include at least an access node (or base station), such as an Evolved Node B (eNodeB) or a next-generation Node B (gNodeB), and one or a plurality of end-user wireless devices; however, the present disclosure is not limited to such a configuration. Various aspects of the present disclosure may also be applied to communication between an end-user wireless device and other network resources, such as relay nodes, controller nodes, antennas, and so on. Moreover, multiple access nodes may be utilized. For example, some wireless devices in the network may communicate with an LTE eNodeB, while others may communicate with an NR gNodeB. Additionally, for purposes of illustration and explanation, various portions of this detailed description refer to implementations in a network a 5G NR RAT; however, the present disclosure is not so limited. The systems and methods described herein may be implemented in a network using any RAT capable of supporting BWPs, including further extensions or updated implementations of 5G (e.g., 5G Advanced) or newer generations of RATs.

FIG. 1 illustrates an exemplary system 100 for use with various aspects of the present disclosure. As illustrated, the system 100 includes a cloud platform 110, a core network 120, and a plurality of access nodes 130-1 to 130-*m* (collectively referred to as access nodes 130), and a plurality of wireless devices 140-1 to 140-*n* (collectively referred to as wireless devices 140). Other computing systems and devices 150 may be connected to the cloud platform 110, for example to monitor and/or control the wireless devices 140. While FIG. 1 illustrates only two of the access nodes 130, in practical implementations any number of the access nodes 130 (including one) may be present in the system 100. Moreover, while FIG. 1 illustrates seven of the wireless devices 140 and illustrates various subsets of the wireless devices 140 being connected to individual ones of the access nodes 130, the present disclosure is not so limited. In practical implementations, any number of the wireless devices 140 (including zero or one) may be present in total, and any number of such wireless devices 140 (including zero or one) may be connected to each access node 130. As illustrated, various elements of FIG. 1 are connected to one another via wireless connections; however, some of the connections may be wired connections. For example, an access node 130 may be connected to the core network 120 via a wired connection.

The cloud platform 110, which may be an NR cloud platform, may perform processing and forward results to the computing systems and devices 150 and/or the wireless devices 140. The core network 120, which may be a 5G Core Network (5GCN), connects with the cloud platform 110 and the access nodes 130. Examples of the core network and/or the access nodes 130 will be described in more detail below with respect to FIGS. 2 and 3. Subsets of the access nodes 130 may be respectively configured to provide service in different areas, on different bands, for different RATs, and so on. FIG. 1 illustrates a situation in which the system 100 is operated by a single network operator. In many geographical areas, multiple access nodes 130 provide coverage that may overlap.

The wireless devices 140 are devices configured with appropriate technologies for connecting to the cloud platform 110. The wireless devices 140 may be or include mobile communication devices such as smartphones, laptop computers, tablet computers, and the like; vehicles such as cars, trucks, and the like; and/or Internet-of-Things (IoT)

devices such as smart-home sensors, and the like. Examples of the wireless devices 140 will be described in more detail below with respect to FIGS. 2 and 4.

Figure 2:
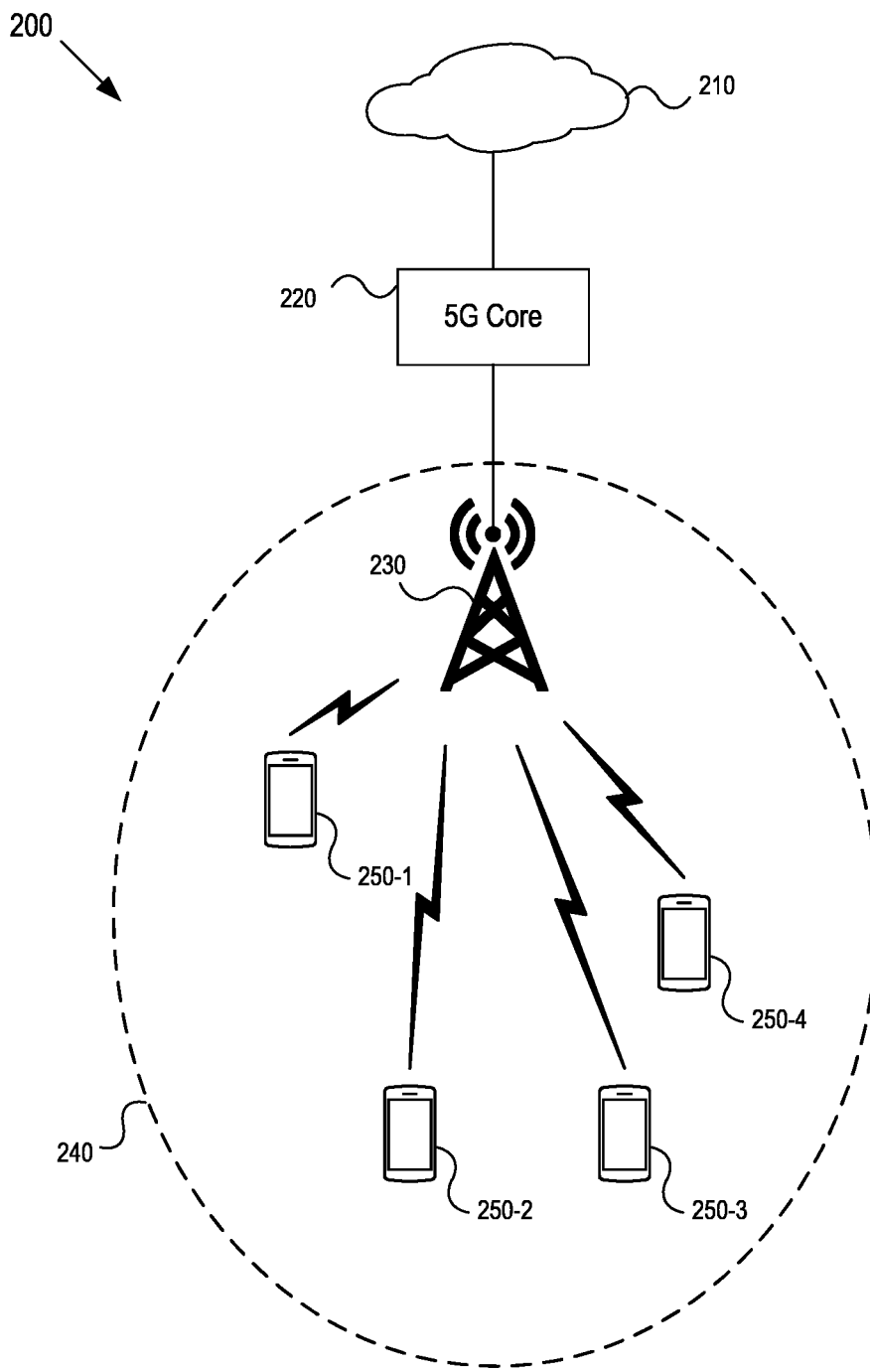
FIG. 2 illustrates an exemplary configuration of a system for wireless communication in accordance with various aspects of the present disclosure

FIG. 2 illustrates a configuration in which a system 200 provides coverage via an access node within a particular area. For purposes of illustration and explanation, the system 200 is illustrated as a 5G System (5GS); however, in practical implementations the system 200 may correspond to any RAT or combinations of RATs, including but not limited to 3G RATs such as GSM, UMTS, CDMA, etc.; 4G RATs such as WiMAX, LTE, etc.; 5G RATs such as NR; and further extensions or updated implementations of the same.

As illustrated, the system 200 comprises a communication network 210, a 5G core 220, an access node 230 which provides service in a coverage area 240, and a plurality wireless devices 250-1 to 250-4 (collectively referred to as wireless devices 250). For purposes of illustration and ease of explanation, only one access node 230 and four wireless devices 250 are shown in the system 200; however, as noted above with regard to FIG. 1, additional access nodes and/or additional or fewer wireless devices may be present in the system 200. In the illustration of FIG. 2, the access node 230 is connected to the communication network 210 via an NR path (including the 5G core 220); however, in practical implementations the access node 230 may be connected to the communication network 210 via multiple paths (e.g., using multiple RATs). The access node 230 communicates with the 5G core 220 via one or more communication links, each of which may be a direct link (e.g., an N2 link, an N3 link, or the like). The access node 230 may also communicate with additional access nodes via a direct link.

A scheduling entity may be located within the access node 230 and/or the 5G core 220, and may be configured to accept and deny connection requests and manage communication sessions, to allocate resources and RATs to improve overall network resource utilization and performance, to configure connected wireless devices, and the like. The access node 230 may be any network node configured to provide communications between the connected wireless devices and the communication network 210, including standard access nodes and/or short range, lower power, small access nodes. As examples of a standard access node, the access node 230 may be a macrocell access node, a base transceiver station, a radio base station, a gNodeB in 5G networks, an eNodeB in 4G/LTE networks, or the like, including combinations thereof. In one particular example, the access node 230 may be a macrocell access node in which a range of the coverage area 240 is from approximately five to thirty-five kilometers (km) and in which the output power is in the tens of watts (W). As examples of a small access node, the access node 230 may be a microcell access node, a picocell access node, a femtocell access node, or the like, including a home gNodeB or a home eNodeB.

The access node 230 can comprise one or more electronic processors and associated circuitry to execute or direct the execution of computer-readable instructions such as those described herein. In so doing, the access node 230 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the access node 230 can receive instructions and other input at a user interface.

Figure 3:
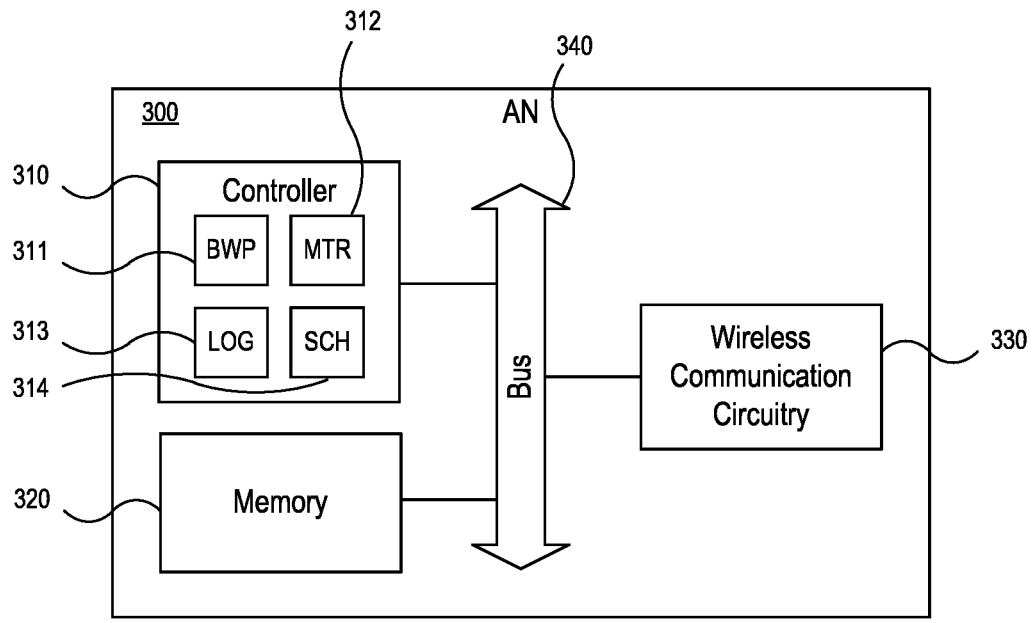
FIG. 3 illustrates an exemplary access node in accordance with various aspects of the present disclosure.

FIG. 3 illustrates one example of an access node 300, which may correspond to one or more of the access nodes 130 shown in FIG. 1 and/or the access node 230 shown in FIG. 2. The access node 300 may be configured to communicate with a plurality of wireless devices using a wideband (e.g., a carrier or combination of carriers) including at least one narrowband (e.g., including a first BWP and a second BWP). As illustrated the access node 300 includes a controller 310, a memory 320, wireless communication circuitry 330, and a bus 340 through which the various elements of the access node 300 communicate with one another. The controller 310 is one example of an electronic processor, and may include sub-modules or units, each of which may be implemented via dedicated hardware (e.g., circuitry), software modules which are loaded from the memory 320 and processed by the controller 310, firmware, and the like, or combinations thereof. These include a BWP configuration module 311, a monitoring module 312, a logic module 313, and a scheduling module 314. Some or all of the sub-modules or units may physically reside within the controller 310, or may instead reside within the memory 320 and/or may be provided as separate units within the access node 300, in any combination. The various sub-modules or units may include or implement logic circuits, thereby to perform operations such as setting parameters, monitoring parameters, comparing parameters, generating instructions, and so on.

While FIG. 3 illustrates the BWP configuration module 311, the monitoring module 312, the logic module 313, and the scheduling module 314 as being separate modules, in practical implementations some of the modules may be combined with one another and/or may share components (e.g., logic gates). Through the BWP configuration module 311, the monitoring module 312, the logic module 313, and the scheduling module 314, the access node 300 (e.g., the controller 310) may be configured to perform various operations to implement methods in accordance with the present disclosure. While one example of operations performed by the modules is described here, in practical implementations at least some of the operations described as being performed by one module may instead be performed by another module, including a module not explicitly named here.

The BWP configuration module 311 may be configured to define one or more BWPs for wireless devices connected to the access node 300. For example, the BWP configuration module 311 may configure two or more BWPs for a wireless device which may reside within a single CC or band, or across multiple CCs or bands. In one particular implementation, the BWP configuration module 311 is configured to configure a first BWP and a second BWP for the wireless device, although in other implementations any number of BWPs may be configured. The BWP configuration module 311 may also instruct a connected wireless device that either the first BWP or the second BWP is initially the active BWP (e.g., the BWP over which the wireless device is configured to communicate with the access node 300). To accomplish this, the BWP configuration module 311 may transmit a message to the wireless device which includes a configuration file specifying several parameters including, for each BWP: a BWP identifier, a resource allocation type, a starting resource identifier (e.g., a starting RB index), and a resource length (e.g., a number of contiguous RBs). In some implementations, the message may further include parameters such as a subcarrier spacing (SCS), a numerology, and the like.

The monitoring module 312 may be configured to monitor a traffic quality parameter or, in some implementations, multiple traffic quality parameters. A traffic quality parameter may be related to any measure of the quality of wireless communications between the wireless device and the access node, including but not limited to a throughput, a signal level, a signal to noise ratio (SNR), a SINR, a reverse noise rise (RNR), a latency, a packet loss percentage, and the like. The value of the traffic quality pattern may be determined as an average over a predetermined time window, the length of which may be set or reset by a network operator. In some implementations, the actual value of the traffic quality parameter may be determined by the wireless device itself, and the monitoring module 312 may monitor information from the wireless device in determining the actual value of the traffic quality parameter. The monitoring module 312 may also be configured to monitor or determine an expected value of the traffic quality parameter if a wireless device were switched from the current BWP to another BWP. In determining the expected value of the traffic quality parameter, the monitoring module 312 may use historical data over a predetermined period of time (e.g., a period set by the network operator), which in some implementations is stored in the memory 320. Additionally or alternatively, the monitoring module 312 may perform parallel monitoring of multiple BWPs (e.g., all or a subset of the BWPs configured or defined by the BWP configuration module 311). Additionally or alternatively, the monitoring module 312 may receive information from one or more wireless devices connected to the access node 300 across several BWPs, and use the information to determine the actual value and/or expected value of the traffic quality parameter in the respective BWPs.

The logic module 313 may be configured with various logic circuits or elements in order to various logic operations, including but not limited to operations of comparing, monitoring, and identifying various aspects of the network and/or the access node 300. For example, the logic module 313 may be configured to compare the actual value of the traffic quality parameter or parameters (i.e., a measure of the quality of wireless communications in the current BWP) to the expected value of the traffic quality parameter or parameters (i.e., a measure of the expected quality of wireless communications if the communications were switched to another BWP). The logic module 313 may be configured to output the result of the determination; for example, the logic module 313 may output the identity of the BWP expected to provide the best value of the traffic quality parameter (e.g., the highest throughput, the highest SINR, the lowest packet loss percentage, etc.) and/or the difference in the actual value of the traffic quality parameter in the current BWP and the expected value of the traffic quality parameter in another BWP.

The scheduling module 314 may be configured to determine the manner in which the wireless device connected to the access node 300 perform communications with the access node 300. For example, the scheduling module 314 may be configured to schedule communications with the wireless device so that they are performed using a particular BWP (e.g., a first BWP). The scheduling module 314 may also be configured to cause BWP switching. For example, in response to a determination made by the logic module 313 (e.g., a determination that the BWP expected to provide the best value of the traffic quality parameter is not the current BWP, etc.), the scheduling module 314 may be configured to instruct the wireless device to switch from communication with the access node 300 over the first BWP to communication with the access node 300 over the second BWP, for example by transmitting a first instruction. In some implementations, the scheduling module 314 may be configured to cause BWP switching only in the case where the improvement in traffic quality parameter due to the switch exceeds a predetermined threshold (e.g., where the expected value of the traffic quality parameter in the second BWP exceeds the actual value of the traffic quality parameter in the first BWP by a predetermined margin).

After an initial BWP switching has been performed, for example to switch the wireless device from the first BWP to the second BWP, the monitoring module 312, the logic module 313, and the scheduling module 314 may be configured to continue performing similar operations relative to the new (second) BWP. For example, if it is determined that the wireless device is communicating over the second BWP, the monitoring module 312 may continue to monitor the actual value of the traffic quality parameter, which now corresponds to communications between the wireless device and the access node using the second BWP. The monitoring module 312 may also be configured to continue determining at least one expected value of the traffic quality parameter, which now corresponds to communications between the wireless device and the access node using the first BWP or any other BWPs present in the network. Subsequently, in response to a further determination made by the logic module 313 (e.g., a determination that expected value of the traffic quality parameter exceeds the actual value of the traffic quality parameter, either absolutely or by a predetermined margin), the scheduling module 314 may be configured to instruct the wireless device to switch from communication with the access node 300 over the second BWP back to communication with the access node 300 over the first BWP, for example by transmitting a second instruction. In some implementations, the scheduling module 314 may be configured to wait after transmitting the first instruction for a predetermined amount of time before transmitting the second instruction in order to prevent switching from occurring at an undesirably high frequency. The instructions may be sent via a Downlink Control Information (DCI) transmission to the wireless device.

The operations performed by the BWP configuration module 311, the monitoring module 312, the logic module 313, and/or the scheduling module 314 may be performed individually for each of the wireless devices connected to the access node 300. In this manner, the allocation of wireless devices to BWPs may be tailored to the particular communication conditions of the access node in a holistic manner, for example to provide load balancing. Examples of BWP allocations operations collectively performed by the BWP configuration module 311, the monitoring module 312, the logic module 313, and/or the scheduling module 314 are illustrated in FIG. 5.

Figure 5:
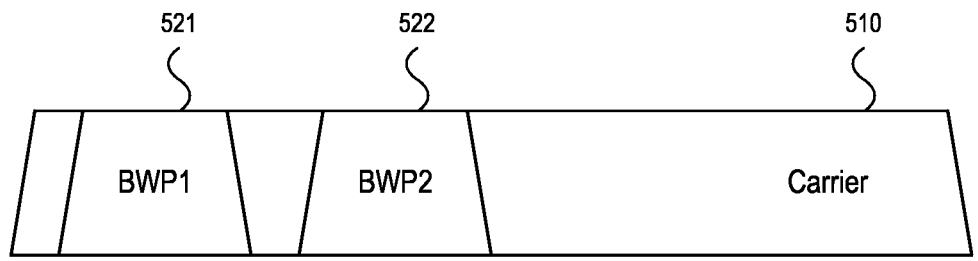
FIG. 5 illustrates an exemplary in-band resource allocation in accordance with various aspects of the present disclosure.

In FIG. 5, the access node 300 is configured for communication with one or more wireless devices in a comparatively wide carrier 510 which includes a first BWP 521 and a second BWP 522. The first BWP 521 and the second BWP 522 include frequency resources within the overall frequency range of the carrier 510, and (although not illustrated in FIG. 5) the carrier 510 may itself include frequency resources within a wider band. While FIG. 5 illustrates the first and second BWPs 521 and 522 as non-overlapping, in practical implementations the first and second BWPs 521 and 522 may be at least partially overlapping. In one particular example, the carrier 510 has a bandwidth of 100 MHz. However, as noted above, the carrier 510 may have a bandwidth of up to 100 MHz in Frequency Range 1 and up to 400 MHz in Frequency Range 2. In some implementations, both the first and second BWPs 521 and 522 may have identical bandwidths of 20 MHz, although in other implementations one or both of the first and second BWPs 521 and 522 may have bandwidths different from 20 MHz and/or different from one another. Moreover, while only two BWPs are expressly illustrated in FIG. 5, in practical implementations any number of BWPs may be configured within the carrier 510. Additionally, while FIG. 5 illustrates the first BWP 521 and the second BWP 522 residing within the same carrier 510, in practical implementations the first and second BWPs 521 and 522 may be distributed across different carriers.

Returning to FIG. 3, the wireless communication circuitry 330 may include circuit elements configured for inbound communication to receive wireless signals (e.g. one or more antennas) as well as interface elements configured, for example, to translate data signals from wireless input into control or other signals for the controller 310. Moreover, the wireless communication circuitry 330 may include circuit elements configured for outbound communication to generate wireless signals (e.g., one or more antennas) as well as interface elements configured, for example, to translate control signals from the controller 310 into data signals for wireless output. For example, the access node 300 may be configured to receive communications from the wireless device via the wireless communication circuitry 330 and output communications and/or control signals or instructions to the wireless device via the wireless communication circuitry 330, thereby managing traffic and network resources. The access node 300 may include additional wireless communication circuitry elements, for example to communicate using additional frequencies and/or to provide connectivity for different RATs. The access node 300 may further include additional wired communication circuitry elements.

Figure 4:
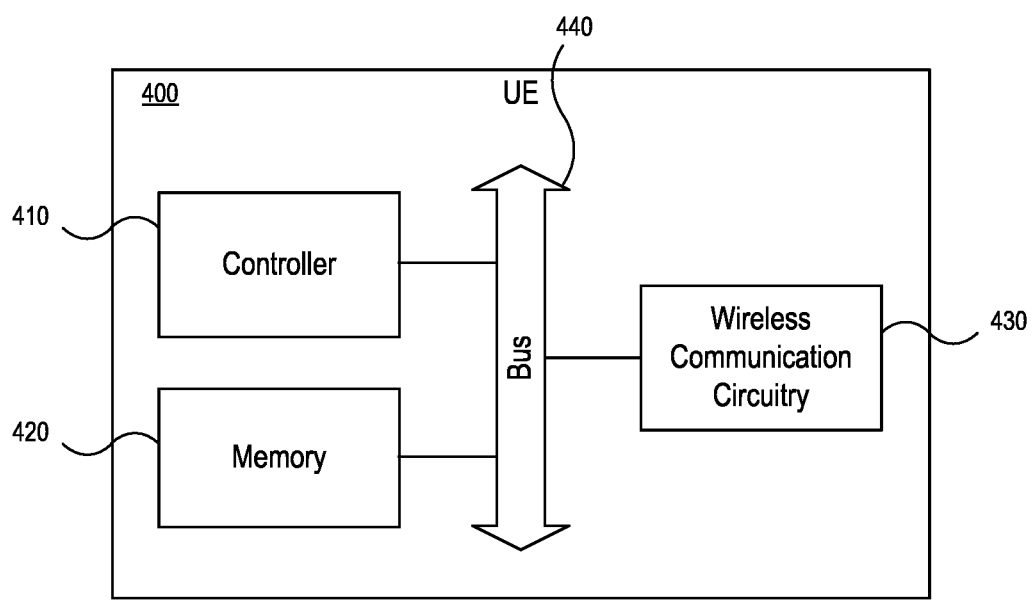
FIG. 4 illustrates an exemplary wireless device in accordance with various aspects of the present disclosure.

FIG. 4 illustrates one example of a wireless device 400 (i.e., a UE), which may correspond to one or more of the wireless devices 140 shown in FIG. 1 and/or one or more of the wireless devices 250 shown in FIG. 2. As illustrated, the wireless device 400 includes a controller 410, a memory 420, a wireless communication circuitry 430, and a bus 440 through which the various elements of the wireless device 400 communicate with one another. The controller 410 includes various sub-modules or units to implement operations and processes in accordance with the present disclosure. For example, the controller 410 may include modules that (e.g., in response to commands or instructions from an access node) may cause the wireless device 400 to switch among various carriers and/or various BWPs. Alternatively, the controller 410 may load a module from the memory 420 (e.g., a software module) to switch among various carriers and/or various BWPs.

The wireless communication circuitry 430 may include circuit elements configured for inbound communication to receive wireless signals (e.g. one or more antennas) as well as interface elements configured, for example, to translate data signals from wireless input into control or other signals for the controller 410. Moreover, the wireless communication circuitry 430 may include circuit elements configured for outbound communication to generate wireless signals (e.g., one or more antennas) as well as interface elements configured, for example, to translate control signals from the controller 410 into data signals for wireless output. For example, the wireless device 400 may be configured to transmit communications to the access node via the wireless communication circuitry 430 and receive communications and/or control signals or instructions from the access node via the wireless communication circuitry 430. The wireless device 400 may include additional wireless communication circuitry elements, for example to communicate using different RATs or different frequency resources.

Returning to FIG. 2, the communication network 210 can be a wired and/or wireless communication network, and can comprise processing nodes, routers, gateways, and physical and/or wireless data links for carrying data among various network elements, including combinations thereof, and can include a local area network (LAN) or a wide area network (WAN), and an internetwork (including the Internet). The communication network 210 can be capable of carrying data, for example to support voice, push-to-talk (PTT), broadcast video, and/or data communications by the wireless devices 250. Wireless network protocols can comprise Multimedia Broadcast Multicast Services (MBMS), CDMA, 1xRTT, GSM, UMTS, High Speed Packet Access (HSPA), Evolution-Data Optimised (EV-DO), EV-DO rev. A, 3GPP LTE, WiMAX, 4G including LTE Advanced and the like, and 5G including 5G NR or 5G Advanced, or combinations thereof. Wired network protocols that may be utilized by the communication network 210 comprise Ethernet, Fast Ethernet, Gigabit Ethernet, Local Talk (e.g., Carrier Sense Multiple Access with Collision Avoidance), Token Ring, Fiber Distributed Data Interface (FDDI), and Asynchronous Transfer Mode (ATM). The communication network 210 may also comprise additional base stations, controller nodes, telephony switches, internet routers, network gateways, computer systems, communication links, other types of communication equipment, and combinations thereof.

The communication links connecting the access node 230 to the 5G core 220 may respectively use various communication media, such as air, space, metal, optical fiber, other signal propagation paths, and combinations thereof. The communication links may respectively be wired or wireless and use various communication protocols such as Internet, Internet protocol (IP), LAN, optical networking, hybrid fiber coax (HFC), telephony, T1, other communication formats, and combinations, improvements, or variations thereof. Wireless communication links may use electromagnetic waves in the radio frequency (RF), microwave, infrared (IR), or other wavelength ranges, and may use a suitable communication protocol, including but not limited to MBMS, CDMA, 1xRTT, GSM, UMTS, HSPA, EV-DO, EV-DO rev. A, 3GPP LTE, WiMAX, 4G including LTE Advanced and the like, and 5G including 5G NR or 5G Advanced, or combinations thereof. The communication links may respectively be a direct link or might include various equipment, intermediate components, systems, and networks. The communication links may comprise many different signals sharing the same link.

The communication network 210, the access node 230, and/or the 5G core 220 may collectively implement several control plane network functions (NFs) and user plane NFs. The control plane NFs include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The user plane NFs include but are not limited to a User Plane Function (UPF). Control plane NFs can provide one or more NFs based on a request-response or subscribe-notify model. In some implementations, the PCF implements the URSP manager. The NFs may form a micro services-based architecture, which may include network functions distributed over different cloud infrastructures. Additionally, many services may span different network functions and domains that work in unison.

The NRF maintains the list of available network functions and their profiles. The NRF maintains an updated repository of the network components along with services provided by each of the elements in the core network. The NRF additionally provides a discovery mechanism that allows the elements to discover each other. The NRF provides a registration function that allows each network function to register a profile and a list of services with the NRF. It also performs services registration and discovery so that different network functions can find each other. As one example, the SMF, which is registered to NRF, becomes discoverable by the AMF when a UE or other device tries to access a service type served by the SMF. The NRF broadcasts available services once they are registered in the 5G core 220. To use other network functions, registered functions can send service requests to the NRF.

The UDM interfaces with NFs such as AMF and SMF so that relevant data becomes available to AMF and SMF. The UDM generates authentication vectors when requested by the AUSF, which acts as an authentication server. The AMF performs the role of access point to the 5G core 220, thereby terminating RAN control plane and UE traffic originating on either the N1 or N2 reference interface. In the 5G core 220, the functionality of the 4G Mobility Management Entity (MME) is decomposed into the AMF and the SMF. The AMF receives all connection and session related information from the UE using N1 and N2 interfaces, and is responsible for handling connection and mobility management tasks.

A Unified Data Repository (UDR) may also be present. The UDR may provide unified data storage accessible to both control plane NFs and user plane NFs. Thus, the UDR may be a repository shared between control plane NFs and the UPF. The UDR may include information about subscribers, application-specific data, and policy data. The UDR can store structured data that can be exposed to an NF. The UPF may perform operations including, but not limited to, packet routing and forwarding, packet inspection, policy enforcement for the user plane, Quality-of-Service (QoS) handling, etc. When compared with 4G EPC, the functions of the UPF may resemble those of the SGW-U (Serving Gateway User Plane function) and PGW-U (PDN Gateway User Plane function).

Other network elements may be present in the system 200 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g., between the access node 230 and the communication network 210.

Figure 6:
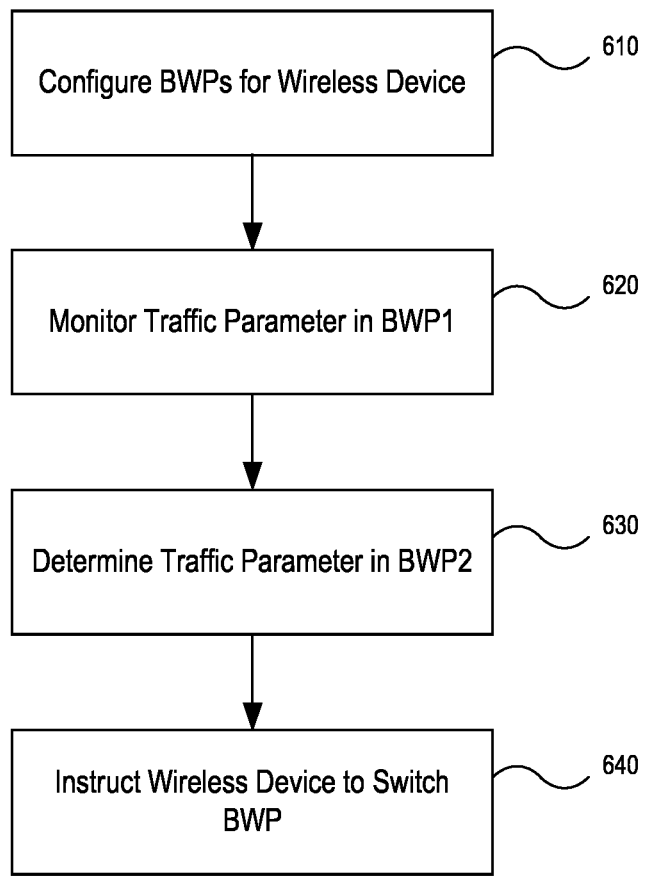
FIG. 6 illustrates an exemplary process flow for managing resources in accordance with various aspects of the present disclosure.

FIG. 6 illustrates an exemplary process flow for managing resources (i.e., for dynamically switching resource allocation types using BWPs). The operations of FIG. 6 will be described as being performed by the access node 300 in communication with the wireless device 400 for purposes of explanation. In other implementations, the operations may be performed by or under the control of a processing node external to the access node 300, and may be performed with regard to communications with a device other than the wireless device 400. Generally, the process flow of FIG. 6 may be implemented using any access node that is configured to communicate with any wireless device over a wideband which includes BWPs.

The process flow begins at operation 610 with configuring or defining BWPs for one or more wireless devices connected to the access node 300. For example, operation 610 may comprise configuring or defining a first BWP and a second BWP for the wireless device 400. The first BWP may be configured as an initial or default BWP, such that the wireless device 400 is initially or by default configured to communicate with the access node 300 using the first BWP. In some implementations, operation 610 may be performed by transmitting a configuration file to the wireless device 400, the configuration file defining the first BWP and the second BWP.

At operation 620, the process flow sets one or more traffic conditions and/or thresholds. The traffic condition may be related to a packet size (e.g., an average packet size over a predetermined time window). One or more thresholds may be set or defined which relate to the traffic condition, which may include one or more packet size thresholds that may be the same as or different from one another. The traffic condition may also relate to parameters other than packet size; for example, the condition may instead relate to a packet type (voice vs. data, background vs. foreground, etc.). The various traffic conditions or thresholds may additionally include time parameters; for example, a predetermined amount of time for which a respective trigger criteria or condition must exist or be met in order for the traffic condition to be deemed satisfied, or a predetermined amount of time for which a respective parameter must be greater than or less than a corresponding threshold must be surpassed in order for it to be determined that the threshold has been surpassed (in the corresponding direction). The duration of the amount of time may be defined by an operator of the access node 300, such as a network operator. In some implementations, the duration may be selected so as to approximate a measure of instantaneous traffic patterns, for example by setting the duration to equal the length of tens of data frames.

Operation 620 includes monitoring an actual value of a traffic quality or parameter or parameters for communications between the wireless device 400 and the access node 300 using the first BWP. A traffic quality parameter may be related to any measure of the quality of wireless communications between the wireless device 400 and the access node 300, including but not limited to a throughput, a signal level, a SNR, a SINR, a RNR, a latency, a packet loss percentage, and the like. The value of the traffic quality pattern may be determined as an average over a predetermined time window, the length of which may be set or reset by a network operator. In some implementations, operation 620 may include receiving information regarding the actual value of the traffic quality parameter from the wireless device.

In operation 630, the access node 300 determines an expected value of the traffic quality parameter for communications between the wireless device 400 and the access node 300 using the second BWP. The expected value of the traffic quality parameter may correspond to the value that the traffic quality parameter is likely or expected to take if the wireless device 400 were switched from communicating over the first BWP to communicating over the second BWP. In determining the expected value of the traffic quality parameter, operation 630 may include the use of historical data over a predetermined period of time (e.g., a period set by the network operator). Additionally or alternatively, operation 630 may include the parallel monitoring of multiple BWPs (e.g., all or a subset of the BWPs configured or defined in operation 610). Additionally or alternatively, operation 630 may include receiving information from one or more additional wireless devices connected to the access node 300 across several BWPs, and the use the information to determine the expected value of the traffic quality parameter in the respective BWPs. Operation 630 may additionally include determining whether the expected value of the traffic quality parameter exceeds the actual value of the traffic quality parameter, for example by comparing the actual value of the traffic quality parameter or parameters (i.e., a measure of the quality of wireless communications in the current BWP) to the expected value of the traffic quality parameter or parameters (i.e., a measure of the expected quality of wireless communications if the communications were switched to another BWP). In some implementations, the actual and/or expected values of the traffic quality parameter may be determined by monitoring or determining actual and/or expected traffic patterns, which may be either historical patterns or instantaneous patterns determined as an average over a predetermined window of time.

In response to a determination that the expected value of the traffic quality parameter exceeds the actual value of the traffic quality parameter, at operation 640 the access node 300 instructs the wireless device 400 to switch from communication with the access node 300 using the first BWP to communication with the access node 300 using the second BWP. Operation 640 may include transmitting a DCI transmission to the wireless device 400 to cause the wireless device 400 to switch BWPs. In some implementations, operation 640 may only trigger in the event that it is determined (e.g., in operation 630) that the expected value of the traffic quality parameter in the second BWP exceeds an actual value of the traffic quality in the first BWP by a predetermined margin, which may be configurable by the network operator.

In some implementations, after the performance of operation 640, the process flow may return to operation 620 and perform similar operations for the second BWP, over which the access node 300 and the wireless device 400 are now communicating. For example, after transmitting a first instruction to the wireless device 400 and causing the wireless device 400 to switch to communicating using the second BWP, the access node 300 may monitor an actual value of the traffic quality parameter for communications between the wireless device 400 using the second BWP. In such situations, the access node 300 may also determine an expected value of the traffic quality parameter for communications between the wireless device 400 using the first BWP and/or in response to a determination that the traffic quality parameter would be improved if the wireless device were communicating with the access node using the first BWP, transmitting a second instruction to the wireless device, the second instruction causing the wireless device to revert from using the second BWP to using the first BWP.

The operations of FIG. 6 need not necessarily be performed one after another in immediate sequence. For example, operation 610 may be performed in advance, for example during a network configuration operation and/or during startup of the access node 300. Subsequently, operation 620 and/or 630 may be performed continuously or continually until operation 630 determines that the expected value of the traffic quality parameter exceeds the actual value of the traffic quality parameter, at which point operation 640 may occur. Subsequently, operation 620 and/or 630 may again be performed continuously or continually until it is determined that another BWP switching operation should occur, and so on. In some implementations, the process flow of FIG. 6 may implement a waiting period between instances of operation 640 such that BWP switching does not occur at an undesirably high frequency.

While the above descriptions illustrate various aspects of the present disclosure in which only a single BWP switching is performed (and in some cases reverted) among two different BWPs, the present disclosure is not so limited. The methods, operations, etc. described above may be performed in parallel with other forms of resource management, whether or not the other forms are based on the use of BWPs. For example, the systems, methods, and devices herein may operate with regard to any number of BWPs having similar or different characteristics, such as similar or different numerologies, resource allocation types, bandwidths, etc.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of managing network communications, comprising:
    configuring a first bandwidth part (BWP) and a second BWP for a wireless device,
    wherein the wireless device is configured to communicate with an access node using the first BWP;
    monitoring an actual value of a traffic quality parameter for communications between the wireless device and the access node using the first BWP;
    determining an expected value of the traffic quality parameter for communications between the wireless device and the access node using the second BWP based on information from at least one additional wireless device in communication with the access node using the second BWP; and
    in response to a determination that the expected value of the traffic quality parameter exceeds the actual value of the traffic quality parameter, instructing the wireless device to switch from communication with the access node using the first BWP to communication with the access node using the second BWP.

2. The method according to claim 1, wherein the traffic quality parameter is based on a throughput for communications between the wireless device and the access node.

3. The method according to claim 1, wherein the traffic quality parameter is based on a signal to interference and noise ratio for communications between the wireless device and the access node.

4. The method according to claim 1, wherein the actual value of the traffic quality parameter is determined as an average over a predetermined time window.

5. The method according to claim 1, wherein the expected value of the traffic quality parameter is determined based on historical traffic data.

6. The method according to claim 1, further comprising:
    after instructing the wireless device to switch from communication with the access node over the first BWP to communication with the access node using the second BWP:
        monitoring an actual value of the traffic quality parameter for communications between the wireless device and the access node using the second BWP,
        determining an expected value of the traffic quality parameter for communications between the wireless device and the access node using the first BWP, and
        in response to a determination that the expected value of the traffic quality parameter exceeds the actual value of the traffic quality parameter, instructing the wireless device to switch from communication with the access node using the second BWP to communication with the access node over the using BWP.

7. A system for managing network communications, comprising:
    an access node configured to communicate with a wireless device over a band including a first bandwidth part (BWP) and a second BWP, the access node including at least one electronic processor configured to perform operations including:
        determining that the wireless device is communicating with the access node using the first BWP;
        monitoring a traffic quality parameter for communications between the wireless device and the access node using the first BWP;
        determining that the traffic quality parameter would be improved if the wireless device were communicating with the access node using the second BWP if an expected value of the traffic quality parameter in the second BWP exceeds an actual value of the traffic quality parameter in the first BWP by a predetermined margin; and
        in response to a determination that the traffic quality parameter would be improved if the wireless device were communicating with the access node using the second BWP, transmitting a first instruction to the wireless device, the first instruction causing the wireless device to switch from using the first BWP to using the second BWP.

8. The system according to claim 7, wherein the traffic quality parameter is a measure of a throughput for communications between the wireless device and the access node.

9. The system according to claim 7, wherein the traffic quality parameter is a measure of a signal to noise ratio for communications between the wireless device and the access node.

10. The system according to claim 7, wherein transmitting the first instruction to the wireless device includes sending a Downlink Control Information (DCI) transmission.

11. The system according to claim 7, wherein monitoring the traffic quality parameter includes determining an average value of the traffic quality parameter for the communications over a predetermined window of time.

12. The system according to claim 7, wherein the predetermined margin is configurable by a network operator.

13. The system according to claim 7, further comprising:
    after transmitting the first instruction to the wireless device:
        monitoring the traffic quality parameter for communications between the wireless device and the access node using the second BWP, and
        in response to a determination that the traffic quality parameter would be improved if the wireless device were communicating with the access node using the first BWP, transmitting a second instruction to the wireless device, the second instruction causing the wireless device to revert from using the second BWP to using the first BWP.

14. A non-transitory computer-readable medium storing instructions that, when executed by an electronic processor of a processing node, cause the processing node to perform operations comprising:
    defining a first dedicated bandwidth part (BWP) and a second BWP for communications between an access node and a first wireless device, wherein the first BWP and the second BWP utilize resources in a same communication band;
    monitoring an actual traffic pattern for communications between the access node and the first wireless device using the first BWP;
    determining an expected traffic pattern for communications between the access node and the first wireless device using the second BWP;
    determining that the expected traffic pattern exhibits improved communication performance compared to the actual traffic pattern when a throughput using the second BWP exceeds a throughput using the first BWP by a predetermined margin; and in response to a determination that the expected traffic pattern exhibits an improved communication performance compared to the actual traffic pattern, instructing the first wireless device to switch to communicating with the access node using the second BWP.

15. The non-transitory computer-readable medium according to claim 14, wherein determining the expected traffic pattern includes monitoring an actual traffic pattern for communications between the access node and a second wireless device using the second BWP.

16. The non-transitory computer-readable medium according to claim 14, wherein determining the expected traffic pattern includes determining a historical traffic pattern for communications involving the access node using the second BWP.

17. The non-transitory computer-readable medium according to claim 14, wherein the determination that the expected traffic pattern exhibits the improved communication performance at least a
   compared to the actual traffic pattern includes a determination that a signal to noise ratio using the second BWP exceeds a signal to noise ratio using the first BWP by at least a predetermined margin.

* * * * *